(12) United States Patent
Wade

(10) Patent No.: US 6,181,853 B1
(45) Date of Patent: Jan. 30, 2001

(54) WAVELENGTH DIVISION MULTIPLEXING/ DEMULTIPLEXING DEVICE USING DUAL POLYMER LENSES

(75) Inventor: Robert K. Wade, Stratham, NH (US)

(73) Assignee: LightChip, Inc., Salem, NH (US)

( * ) Notice: Under 35 U.S.C. 154(b), the term of this patent shall be extended for 0 days.

(21) Appl. No.: 09/392,831

(22) Filed: Sep. 8, 1999

Related U.S. Application Data

(63) Continuation-in-part of application No. 08/990,199, filed on Dec. 13, 1997, now Pat. No. 5,999,672.

(51) Int. Cl.[7] .............................. G02B 6/34; H04J 14/02
(52) U.S. Cl. ............................ 385/37; 385/14; 385/15; 385/24; 385/31; 385/33; 385/47; 359/124; 359/130; 359/131; 359/127
(58) Field of Search ................................ 385/14, 15, 31, 385/33, 34, 35, 36, 37, 38, 39, 42, 47, 24; 359/124, 130, 131, 127

(56) References Cited

U.S. PATENT DOCUMENTS

| | | | |
|---|---|---|---|
| 4,622,662 | * 11/1986 | Laude et al. | 385/37 X |
| 4,643,519 | * 2/1987 | Bussard et al. | 385/37 X |
| 4,703,472 | * 10/1987 | Blumentritt et al. | 385/37 X |
| 4,763,969 | * 8/1988 | Khoe et al. | 385/37 X |
| 4,819,224 | * 4/1989 | Laude | 385/37 X |
| 4,934,784 | * 6/1990 | Kapany et al. | 385/37 X |
| 5,228,103 | * 7/1993 | Chen et al. | 385/14 |
| 5,748,815 | * 5/1998 | Hamel et al. | 385/37 |
| 5,963,684 | * 10/1999 | Ford et al. | 385/24 |
| 5,966,483 | * 10/1999 | Chowdhury | 385/37 |
| 5,999,672 | * 12/1999 | Hunter et al. | 385/37 |
| 6,011,884 | * 1/2000 | Dueck et al. | 385/24 |
| 6,014,482 | * 1/2000 | Laude | 385/37 X |

\* cited by examiner

*Primary Examiner*—Brian Healy
(74) *Attorney, Agent, or Firm*—Hunton & Williams

(57) ABSTRACT

A wavelength division multiplexing device is disclosed. In a preferred embodiment, the wavelength division multiplexing device comprises a polymer collimating lens for collimating a plurality of monochromatic optical beams, a diffraction grating for combining the plurality of collimated, monochromatic optical beams into a multiplexed, polychromatic optical beam, and a polymer focusing lens for focusing the multiplexed, polychromatic optical beam.

56 Claims, 11 Drawing Sheets

WAVELENGTH DIVISION MULTIPLEXING/ DEMULTIPLEXING DEVICE USING DUAL POLYMER LENSES

CROSS-REFERENCE TO RELATED APPLICATIONS

This patent application is a continuation-in-part patent application of U.S. patent application Ser. No. 08/990,199 (now U.S. Pat. No. 5,999,672, Client Reference No. D-97031), filed Dec. 13, 1997, which is hereby incorporated by reference herein in its entirety.

This patent application is related to U.S. patent application Ser. No. 08/990,197 (Client Reference No. D-99016), now U.S. Pat. No. 6,011,884, filed concurrently herewith and hereby incorporated by reference herein in its entirety.

FIELD OF THE INVENTION

The present invention relates generally to wavelength division multiplexing/demultiplexing and, more particularly, to wavelength division multiplexing/demultiplexing devices using dual polymer lenses.

BACKGROUND OF THE INVENTION

Wavelength division multiplexing (WDM) is a rapidly emerging technology that enables a very significant increase in the aggregate volume of data that can be transmitted over optical fibers. Prior to the use of WDM, most optical fibers were used to unidirectionally carry only a single data channel at one wavelength. The basic concept of WDM is to launch and retrieve multiple data channels in and out, respectively, of an optical fiber. Each data channel is transmitted at a unique wavelength, and the wavelengths are appropriately selected such that the channels do not interfere with each other, and the optical transmission losses of the fiber are low. Today, commercial WDM systems exist that allow for the transmission of 2 to 100 simultaneous data channels.

WDM is a cost-effective method of increasing the volume of data (commonly termed bandwidth) transferred over optical fibers. Alternate competing technologies for increasing bandwidth include the burying of additional fiber optic cable or increasing the optical transmission rate over optical fiber. The burying of additional fiber optic cable is quite costly as it is presently on the order of $15,000 to $40,000 per kilometer. Increasing the optical transmission rate is limited by the speed and economy of the electronics surrounding the fiber optic system. One of the primary strategies for electronically increasing bandwidth has been to use time division multiplexing (TDM), which groups or multiplexes multiple lower rate electronic data channels together into a single very high rate channel. This technology has for the past 20 years been very effective for increasing bandwidth. However, it is now increasingly difficult to improve transmission speeds, both from a technological and an economical standpoint. WDM offers the potential of both an economical and technological solution to increasing bandwidth by using many parallel channels. Further, WDM is complimentary to TDM. That is, WDM can allow many simultaneous high transmission rate TDM channels to be passed over a single optical fiber.

The use of WDM to increase bandwidth requires two basic devices that are conceptually symmetrical. The first device is a wavelength division multiplexer. This device takes multiple beams, each with discrete wavelengths that are initially spatially separated in space, and provides a means for spatially combining all of the different wavelength beams into a single polychromatic beam suitable for launching into an optical fiber. The multiplexer may be a completely passive optical device or may include electronics that control or monitor the performance of the multiplexer. The input to the multiplexer is typically accomplished with optical fibers, although laser diodes or other optical sources may also be employed. As mentioned above, the output from the multiplexer is a single polychromatic beam which is typically directed into an optical fiber.

The second device for WDM is a wavelength division demultiplexer. This device is functionally the opposite of the wavelength division multiplexer. That is, the wavelength division demultiplexer receives a polychromatic beam from an optical fiber and provides a means of spatially separating the different wavelengths of the polychromatic beam. The output from the demultiplexer is a plurality of monochromatic beams which are typically directed into a corresponding plurality of optical fibers or photodetectors.

During the past 20 years, various types of WDMs have been proposed and demonstrated. For example, (1) W. J. Tomlinson, *Applied Optics*, Vol. 16, No. 8, pp. 2180–2194 (August 1977); (2) A. C. Livanos et al., *Applied Physics Letters*, Vol. 30, No. 10, pp. 519–521 (May 15, 1977); (3) H. Ishio et al., *Journal of Lightwave Technology*, Vol 2, No. 4, pp. 448–463 (August 1984); (4) H. Obara et al., *Electronics Letters*, Vol. 28, No. 13, pp. 1268–1270 (Jun. 18, 1992); (5) A. E. Willner et al., *IEEE Photonics Technology Letters*, Vol. 5, No. 7, pp. 838–841 (July 1993); and (6) Y. T. Huang et al., *Optical Letters*, Vol. 17, No. 22, pp. 1629–1631 (Nov. 15, 1992), all disclose some form of WDM device and/or method. However, most of the devices and/or methods disclosed in the above-listed publications are classical optics-based WDM approaches which employ very basic lenses formed of standard optical glass materials that are adequate only for use with multimode optical fibers and are inadequate for use with single mode optical fibers because the core diameter of a single mode optical fiber (i.e., typically 8 $\mu$m) is much smaller than the core diameter of a multimode optical fiber (i.e., typically 62.5 $\mu$m). That is, due to the very basic lenses employed therein, WDM devices incorporating the principles set forth in the classical optics-based WDM approaches disclosed in the above-listed publications are unable to receive and transmit optical beams from and to single mode optical fibers, respectively, without incurring unacceptable amounts of insertion loss and channel crosstalk. These unacceptable levels of insertion loss and channel crosstalk are largely due to the inadequate imaging capabilities of these very basic lenses.

One proposed solution to the above-described optical imaging problem has been to add additional lenses formed of standard optical glass materials to WDM devices, thereby resulting in WDM devices having doublet, triplet, and even higher number lens configurations. By adding these additional lenses to WDM devices, wherein the added lenses typically have alternating high and low refraction indexes, aberrations caused mainly by the spherical nature of the lenses are effectively canceled out. However, an increased cost is associated with adding these additional lenses due to the direct cost of the additional lenses, as well as the indirect costs associated with the increased complexity and resulting decreased manufacturability of WDM devices having multiple lenses.

Another proposed solution to the above-described optical imaging problem has been to use gradient refractive index lenses (e.g., Gradium lenses) in WDM devices. The use of these gradient refractive index lenses results in a significant improvement in the quality of the imaging system within WDM devices. However, costs associated with manufacturing these gradient refractive index lenses is significantly greater than the costs associated with manufacturing standard homogeneous refractive index lenses, despite the fact that both are typically formed of standard optical glass materials.

In view of the foregoing, there remains a real need for a WDM device which possesses or allows for all the characteristics of: low cost, component integration, environmental and thermal stability, low channel crosstalk, low channel signal loss, ease of interfacing, large number of channels, and narrow channel spacing. Accordingly, it would be desirable to provide a WDM device which overcomes the above-described inadequacies and shortcomings, while possessing or allowing for all of the above-stated characteristics.

OBJECTS OF THE INVENTION

The primary object of the present invention is to provide wavelength division multiplexing/demultiplexing devices which use dual polymer lenses to achieve exceptional device performance, as well as reduced device cost, complexity, and manufacturing risk.

The above-stated primary object, as well as other objects, features, and advantages, of the present invention will become readily apparent from the following detailed description which is to be read in conjunction with the appended drawings.

SUMMARY OF THE INVENTION

According to the present invention, a wavelength division multiplexing device is provided. In a preferred embodiment, the wavelength division multiplexing device comprises a polymer collimating lens for collimating a plurality of monochromatic optical beams, a diffraction grating for combining the plurality of collimated, monochromatic optical beams into a multiplexed, polychromatic optical beam, and a polymer focusing lens for focusing the multiplexed, polychromatic optical beam.

The polymer collimating lens and the polymer focusing lens are preferably plano-convex lenses, convex-plano lenses, or bi-convex lenses, although other lens configurations are possible. For example, the polymer collimating lens and the polymer focusing lens can be spherical or aspherical. Also, the polymer collimating lens and the polymer focusing lens preferably operate in the infrared (IR) region of the electromagnetic spectrum since this is the region where the power loss (attenuation) and dispersion of silica-based optical fibers is very low. Accordingly, the polymer collimating lens and the polymer focusing lens are typically formed of a polymer material selected from the group consisting of acrylic, styrene, polycarbonate, copolymers thereof, and other polymer materials that efficiently transmit optical beams in the infrared (IR) region of the electromagnetic spectrum.

The diffraction grating is preferably a transmissive diffraction grating, and the wavelength division multiplexing device preferably comprises a transmissive element associated with the transmissive diffraction grating. The transmissive element preferably has at least one reflective surface for reflecting the multiplexed, polychromatic optical beam, or for reflecting the plurality of collimated, monochromatic optical beams.

In accordance with other aspects of the present invention, the wavelength division multiplexing device can be provided in integrated form. That is, an integrated wavelength division multiplexing device can be provided comprising a polymer collimating lens for collimating a plurality of monochromatic optical beams, a first boot lens affixed to the polymer collimating lens for transmitting the plurality of collimated, monochromatic optical beams from the polymer collimating lens, wherein the first boot lens has a planar exit surface, and a diffraction grating formed at the planar exit surface of the first boot lens for combining the plurality of collimated, monochromatic optical beams into a multiplexed, polychromatic optical beam.

In accordance with further aspects of the present invention, the first boot lens can be incorporated into the polymer collimating lens such that the polymer collimating lens has the planar exit surface at which the diffraction grating is formed.

In accordance with still further aspects of the present invention, the integrated wavelength division multiplexing device can include a second boot lens affixed to the polymer collimating lens for transmitting the plurality of monochromatic optical beams to the polymer collimating lens. The second boot lens preferably has a planar entry surface for accepting the plurality of monochromatic optical beams from at least one optical source (e.g., optical fibers, laser diodes). Alternatively, the integrated wavelength division multiplexing device may do without the second boot lens, and the polymer collimating lens can have a planar entry surface for accepting the plurality of monochromatic optical beams from at least one optical source.

In accordance with still further aspects of the present invention, the diffraction grating is preferably a transmissive diffraction grating, and the integrated wavelength division multiplexing device can include a transmissive element associated with the transmissive diffraction grating, wherein the transmissive element preferably has at least one reflective surface for reflecting the multiplexed, polychromatic optical beam. The integrated wavelength division multiplexing device can then also include a second boot lens affixed to the transmissive element for transmitting the multiplexed, polychromatic optical beam from the transmissive element, and a polymer focusing lens affixed to the second boot lens for focusing the multiplexed, polychromatic optical beam. The second boot lens can be incorporated into the polymer focusing lens such that the polymer focusing lens is affixed to the transmissive element. The integrated wavelength division multiplexing device can then further include a third boot lens affixed to the polymer focusing lens for transmitting the focused, multiplexed, polychromatic optical beam from the polymer focusing lens. The third boot lens preferably has a planar exit surface for outputting the focused, multiplexed, polychromatic optical beam to at least one optical receiver (e.g., optical fibers, photodetectors). Alternatively, the integrated wavelength division multiplexing device may do without the third boot lens, and the polymer focusing lens can have a planar exit surface for outputting the focused, multiplexed, polychromatic optical beam to at least one optical receiver.

In accordance with other aspects of the present invention, the wavelength division multiplexing device can be provided in an alternative integrated form. That is, an alternative integrated wavelength division multiplexing device can be provided comprising a polymer focusing lens for focusing a multiplexed, polychromatic optical beam, a first boot lens affixed to the polymer focusing lens for transmitting the multiplexed, polychromatic optical beam to the polymer focusing lens, wherein the first boot lens has a planar entry surface, and a diffraction grating formed at the planar entry surface of the first boot lens for combining a plurality of monochromatic optical beams into the multiplexed, polychromatic optical beam.

In accordance with further aspects of the present invention, the first boot lens can be incorporated into the polymer focusing lens such that the polymer focusing lens has the planar entry surface at which the diffraction grating is formed.

In accordance with still further aspects of the present invention, the diffraction grating is preferably a transmissive diffraction grating, and the alternative integrated wavelength division multiplexing device can include a transmissive element associated with the transmissive diffraction grating, wherein the transmissive element preferably has at least one reflective surface for reflecting the plurality of monochromatic optical beams toward the transmissive diffraction grating. The alternative integrated wavelength division multiplexing device can then also include a second boot lens affixed to the transmissive element for transmitting the plurality of monochromatic optical beams to the transmissive element, and a polymer collimating lens affixed to the second boot lens for collimating the plurality of monochromatic optical beams prior to transmission by the second boot lens. The second boot lens can be incorporated into the polymer collimating lens such that the polymer collimating lens is affixed to the transmissive element.

At this point it should be noted that the above-described wavelength division multiplexing device, integrated wavelength division multiplexing device, and alternative integrated wavelength division multiplexing device are all bidirectional devices. Thus, the wavelength division multiplexing device can also be a wavelength division demultiplexing device, the integrated wavelength division multiplexing device can also be an integrated wavelength division demultiplexing device, and the alternative integrated wavelength division multiplexing device can also be an alternative integrated wavelength division demultiplexing device. Further, all of the above-described devices can be used simultaneously as both a multiplexer and a demultiplexer.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1b is a perspective end view of a portion of the wavelength division multiplexing device shown in FIG. 1a.

FIG. 2a is a perspective view of a coupling device containing a plurality of laser diodes for replacing the plurality of optical input fibers in the multiplexing device shown in FIG. 1a.

DETAILED DESCRIPTION OF PREFERRED EMBODIMENTS

Figure 1A:
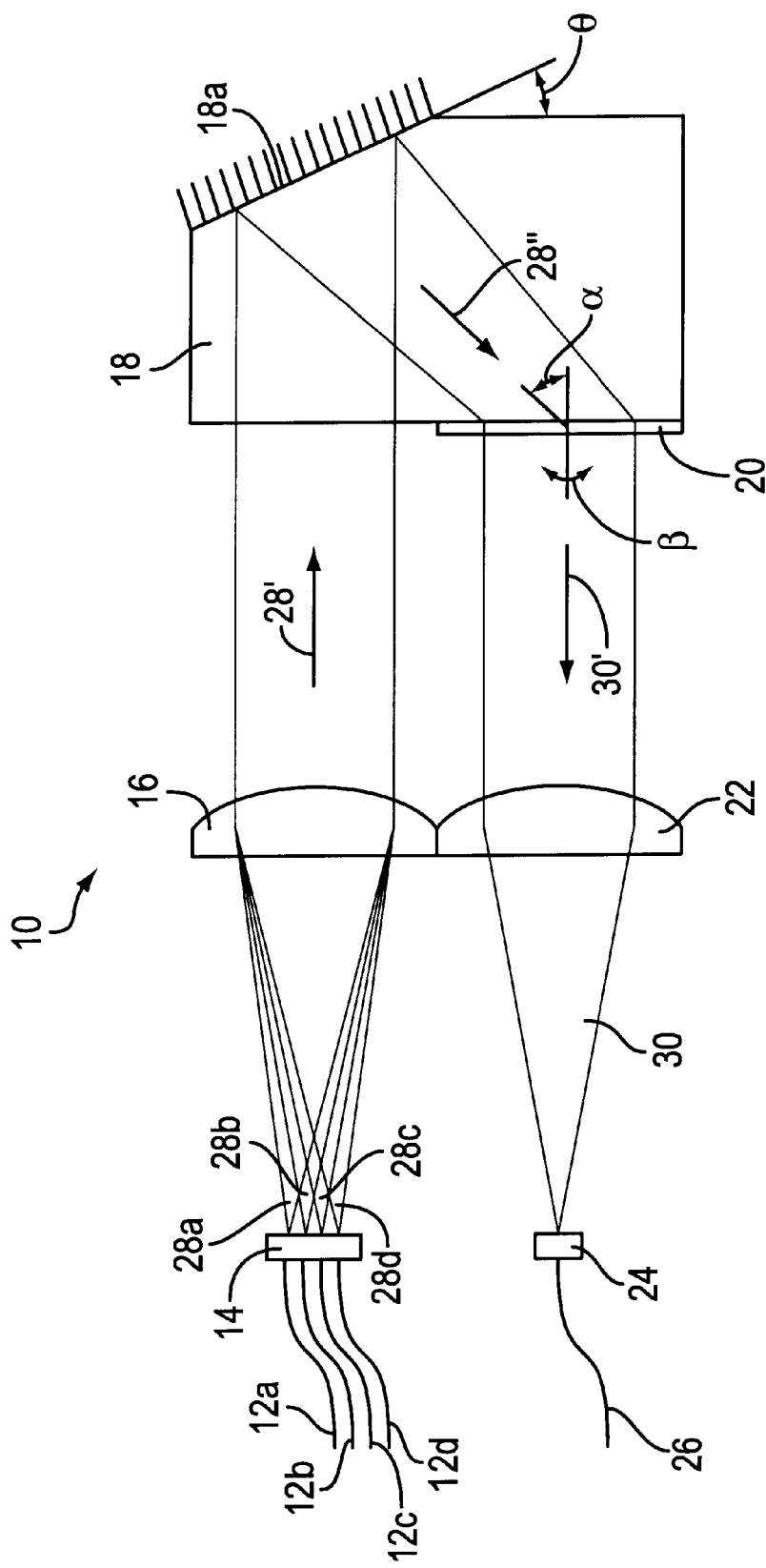
FIG. 1a is a side view of a wavelength division multiplexing device having dual plano-convex polymer collimating/focusing lenses and a transmissive diffraction grating in accordance with the present invention.

Referring to FIG. 1a, there is shown a side view of a preferred embodiment of a wavelength division multiplexing device 10 in accordance with the present invention. The multiplexing device 10 comprises a plurality of optical input fibers 12, an input fiber coupling device 14, a plano-convex polymer collimating lens 16, a reflecting element 18 having a reflecting surface 18a, a transmissive diffraction grating 20, a plano-convex polymer focusing lens 22, an output fiber coupling device 24, and a single optical output fiber 26.

At this point it should be noted that the optical input fibers 12 and the optical output fiber 26, as well as any other optical fibers described herein as being used in conjunction with WDM devices in accordance with the present invention, are single mode optical fibers. Of course, however, this does not limit the present invention WDM devices to use with only single mode optical fibers. For example, the present invention WDM devices can also be used with multimode optical fibers.

It should also be noted that the multiplexing device 10, as well as any other WDM devices described herein as being WDM devices in accordance with the present invention, is operating in the infrared (IR) region of the electromagnetic spectrum as a dense wavelength division multiplexing (DWDM) device (i.e., operating with data channels having channel spacings of 1 nm or less). Of course, however, this does not limit the present invention WDM devices to being only DWDM devices. For example, the present invention WDM devices can also be standard WDM devices (i.e., operating with data channels having channel spacings greater than 1 nm).

Figure 1B:
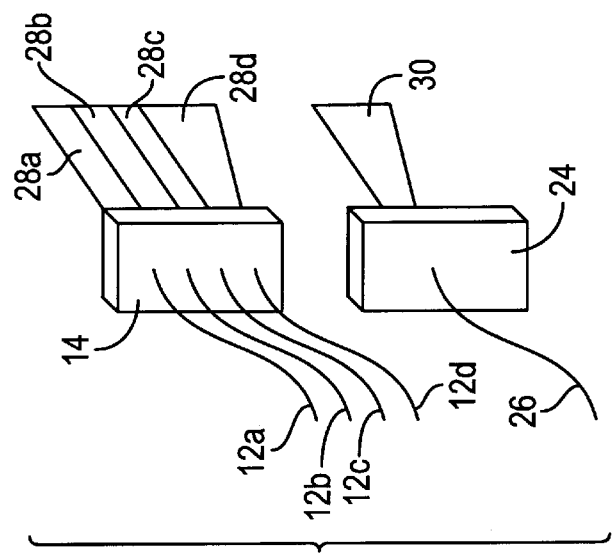

Returning to FIG. 1a, the plurality of optical input fibers 12 are grouped into a one-dimensional input fiber array (i.e., a 1×4 array) by the input fiber coupling device 14, while the single optical output fiber 26 is secured to the output fiber coupling device 24. Both the input fiber coupling device 14 and the output fiber coupling device 24 are used for purposes of ease of optical fiber handling and precision placement, and can be formed of, for example, a silicon V-groove assembly. Referring to FIG. 1b, there is shown a perspective end view of a portion of the multiplexing device 10 revealing how the plurality of optical input fibers 12 are grouped into the one-dimensional input fiber array by the input fiber coupling device 14, and how the single optical output fiber 26 is secured to the output fiber coupling device 24. FIG. 1b also shows a monochromatic optical input beam 28 being transmitted from each of the plurality of optical input fibers 12, and a single multiplexed, polychromatic optical output beam 30 being transmitted to the single optical output fiber 26.

Each of the monochromatic optical input beams 28 being transmitted from the plurality of optical input fibers 12 is carrying a single channel of data at a unique wavelength, which is preferably, but not required to be, within the infrared (IR) region of the electromagnetic spectrum. The single channel of data that is being carried by each monochromatic optical input beam 28 is superimposed on each corresponding unique wavelength by means (e.g., laser diodes connected to the plurality of optical input fibers 12), which are not shown here and which do not form a part of this invention, but are well known in the art. The unique wavelengths of the monochromatic optical input beams 28 are appropriately preselected such that the data channels do not interfere with each other (i.e., there is sufficient channel spacing), and the optical transmission losses through both the optical input fibers 12 and the optical output fiber 26 are low, as is also well known in the art.

The single multiplexed, polychromatic optical output beam 30 being transmitted to the single optical output fiber 26 is carrying a plurality of channels of data at the unique wavelengths of each of the plurality of monochromatic optical input beams 28. The plurality of monochromatic optical input beams 28 are combined into the single multiplexed, polychromatic optical output beam 30 through the combined operation of the plano-convex polymer collimating lens 16, the transmissive diffraction grating 20, and the plano-convex polymer focusing lens 22, as will be described in more detail below.

Referring again to FIG. 1a, each of the plurality of monochromatic optical input beams 28 are transmitted from their corresponding optical input fiber 12 into the air space between the input fiber coupling device 14 and the plano-convex polymer collimating lens 16. Within this air space, the plurality of monochromatic optical input beams 28 are expanded in diameter until they become incident upon the plano-convex polymer collimating lens 16. The plano-convex polymer collimating lens 16 collimates each of the plurality of monochromatic optical input beams 28, and then transmits each of a plurality of collimated, monochromatic optical input beams 28' to the reflecting element 18.

The reflecting element 18 is formed of a transmissive material such as, for example, a standard optical glass material like BK7 (manufactured by Schott Glass Technologies, Inc. with n=1.501@1550 nm). Thus, each of the plurality of collimated, monochromatic optical input beams 28' is transmitted through the reflecting element 18 toward the reflecting surface 18a, which is formed at a reflecting angle, θ, on a beveled edge of the reflecting element 18. The reflecting surface 18a reflects each of the plurality of collimated, monochromatic optical input beams 28' such that a plurality of reflected, collimated, monochromatic optical input beams 28" are transmitted through the reflecting element 18 toward the transmissive diffraction grating 20. The reflecting angle, θ, is chosen based upon the desired center wavelength diffraction angle of the transmissive diffraction grating 20, as will be described in more detail below.

The transmissive diffraction grating 20 operates to angularly disperse the plurality of reflected, collimated, monochromatic optical input beams 28" by an amount that is dependent upon the wavelength of each of the plurality of reflected, collimated, monochromatic optical input beams 28". That is, the transmissive diffraction grating 20 operates according to the well known diffraction grating equation, $$m\lambda = d(\sin \alpha + \sin \beta)$$

wherein m is the diffraction order, $\lambda$ is the wavelength, d is the diffraction grating groove spacing, $\alpha$ is the incident angle with respect to the diffraction grating normal, and $\beta$ is the diffraction angle with respect to the diffraction grating normal. For the multiplexing device 10 shown in FIG. 1a, the diffraction angle, $\beta$, is desired to be 0°, so the incident angle, $\alpha$, is equal to 45° for a center wavelength of 1550 nm and a diffraction grating having an order of 1 and a groove spacing of 0.65 $\mu$m. The reflecting angle, θ, is equal to one-half of the incident angle, $\alpha$, for the multiplexing device 10 shown in FIG. 1a. So the reflecting angle, θ, is equal to 22.5° for the multiplexing device 10 shown in FIG. 1a. Of course, the present invention is not limited to the values just described as they are provided for purposes of illustration only.

At this point it should be noted that the transmissive diffraction grating 20 can be formed from a variety of materials and by a variety of techniques. For example, the transmissive diffraction grating 20 can be formed by a three-dimensional hologram in a polymer medium, or by replicating a mechanically ruled master with a polymer material. The transmissive diffraction grating 20 could then be joined or affixed to the surface of the reflecting element 18 using optical cement or some other optically transparent bonding technique. Alternatively, the transmissive diffraction grating 20 can be formed directly on the surface of the reflecting element 18, thereby avoiding the joining or affixing of the transmissive diffraction grating 20 to the surface of the reflecting element 18.

As previously mentioned, the transmissive diffraction grating 20 operates to angularly disperse the plurality of reflected, collimated, monochromatic optical input beams 28". Thus, the transmissive diffraction grating 20 removes the angular separation of the plurality of reflected, collimated, monochromatic optical input beams 28", and transmits a single collimated, polychromatic optical output beam 30' towards the plano-convex polymer focusing lens 22. The single collimated, polychromatic optical output beam 30' contains each of the unique wavelengths of the plurality of reflected, collimated, monochromatic optical input beams 28". Thus, the single collimated, polychromatic optical output beam 30' is a single collimated, multiplexed, polychromatic optical output beam 30'. The plano-convex polymer focusing lens 22 focuses the single collimated, multiplexed, polychromatic optical output beam 30', and then transmits the resulting single multiplexed, polychromatic optical output beam 30 to the output fiber coupling device 24 where it becomes incident upon the single optical output fiber 26. The single multiplexed, polychromatic optical output beam 30 is then coupled into the single optical output fiber 26 for transmission therethrough.

At this point it should be noted that the single multiplexed, polychromatic optical output beam 30 is insured of being directed to the single optical output fiber 22 in a very efficient manner (i.e., with very low insertion losses and negligible channel crosstalk) by virtue of the precise imaging of both the input optical beams 28 and the output optical beam 30 within the multiplexing device 10 through the use of the plano-convex polymer collimating lens 16 and the plano-convex polymer focusing lens 22. This precise imaging of both the input optical beams 28 and the output optical beam 30 within the multiplexing device 10 is achieved at a very low cost due to the very low cost of the plano-convex polymer collimating lens 16 and the plano-convex polymer focusing lens 22. That is, in comparison to the cost of lenses formed of standard optical glass materials, the cost of lenses formed of polymer materials is far less expensive. For example, the typical cost of a lens formed of a standard optical glass material such as, for example, BK7, is approximately $25.00, while the typical cost of a lens formed of a polymer material such as, for example, acrylic polymer, is approximately $1.00. The reason for this large disparity in cost stems largely from differences in methods of fabrication. For example, while standard optical glass lenses must be fabricated using timely grinding and polishing processes, polymer lenses can be fabricated via quick injection or compression molding processes, which are easily repeatable and can be performed on a very large scale. Another factor which contributes to the large disparity in cost between standard optical glass lenses and polymer lenses is the difference in material costs. For example, the cost of a typical standard optical glass material such as, for example, BK7, is approximately $15.00/lb, while the cost of a typical monomer material such as, for example, acrylic monomer, which is typically used to form acrylic polymer, is approximately $0.50/lb.

At this point it should be noted that polymer lenses, as with all polymer products, are typically formed through the polymerization of one or more monomers. That is, the polymer materials of which the plano-convex polymer collimating lens 16 and the plano-convex polymer focusing lens 22 are formed are themselves typically formed through the polymerization of one or more monomers. Examples of polymer materials of which the plano-convex polymer collimating lens 16 and the plano-convex polymer focusing lens 22 can be formed include arcylic polymer (monomer manufactured by BASF Corporation with a polymer refractive index n=1.481@1550 nm), styrene polymer (monomer manufactured by Arco Chemical Company with a polymer refractive index n=1.568@1550 nm), polycarbonate polymer (monomer manufactured by Akzo Nobel with a polymer refractive index n=1.562@1550 nm), copolymers thereof, and any of a number of other appropriate polymer materials that efficiently transmit optical beams in the infrared (IR) region of the electromagnetic spectrum, since this is the region where the power loss (attenuation) and dispersion of silica-based optical fibers is very low. In fact, most WDM devices are used in the window of 1530–1610 nm, which is the range over which erbium-doped fiber amplifiers (EDFAs) operate and optical fibers have low loss. This 1530–1610 nm region is often called the "third window" for optical fibers. Similarly, however, some WDM devices are also used in the so-called "second window" for optical fibers (i.e., typically within the window of 1300–1330 nm) where optical fibers have very low dispersion and low loss. Consequently, most prior art WDM devices use standard optical glasses that transmit efficiently in these IR regions. For example, standard optical glasses such as FK3 (manufactured by Schott Glass Technologies, Inc. with n=1.450@1550 nm), BK7 (manufactured by Schott Glass Technologies, Inc. with n=1.501@1550 nm), K5 (manufactured by Schott Glass Technologies, Inc. with n=1.506@1550 nm), and Gradium have optical transmission efficiencies of 97–99% for one-inch material thicknesses in these IR regions. This level of transmission efficiency is generally adequate, but, as previously mentioned, there are cost considerations associated with the use of these materials for lenses in WDM devices (i.e., increased component costs for WDM devices requiring multiple lenses formed of standard optical glass materials, and increased fabrication costs for gradient refractive index lenses).

At this point it should be noted that although the multiplexing device 10 is shown using plano-convex polymer collimating/focusing lenses, it is also within the scope of the present invention to use lenses having more than one curved surface and higher number lens configurations. That is, although the collimating/focusing power of only one curved surface on the plano-convex polymer collimating lens 16 and the plano-convex polymer focusing lens 22 is sufficient to provide essentially diffraction-limited collimating/ focusing in the multiplexing device 10, either the collimating lens 16 or the focusing lens 22 are not precluded from being a bi-convex polymer collimating/focusing singlet, doublet, or even higher number lens configuration. In fact, if the collimating lens 16 or the focusing lens 22 is a bi-convex polymer collimating/focusing singlet, doublet, or even higher number lens configuration, the imaging of both the input optical beams 28 and output optical beam 30 within the multiplexing device 10 can be substantially improved, as will be discussed in more detail below. It should also be noted that diffractive optic polymer lenses can also be used.

At this point it should be noted that the plano-convex polymer collimating lens 16 and the plano-convex polymer focusing lens 22, as well as any other polymer collimating/ focusing lens described herein as being used in WDM devices in accordance with the present invention, may be spherical or aspherical in shape. Although spherical lenses are more common than aspherical lenses, mainly due to the fact that they are easier to manufacture when using standard optical glass materials, the performance of a WDM device may be improved by using an aspherical polymer collimating/focusing lens instead of a spherical polymer collimating/focusing lens. That is, the curvature at the edges of an aspherical polymer collimating/focusing lens is less steep than the curvature at the edges of a spherical polymer collimating/focusing lens, thereby resulting in reductions in the level of spherical aberrations in a WDM device incorporating such an aspherical polymer collimating/focusing lens. A benefit of using polymer materials for the collimating/focusing lenses is that a polymer aspherical lens is equally as easy to fabricate as a polymer spherical lens, and, in correspondence with what was previously mentioned regarding the comparative costs of fabricating standard optical glass lenses and polymer lenses, both polymer spherical lenses and polymer aspherical lenses are easier and cheaper to fabricate than any type of standard optical glass lenses.

At this point it should be noted that the plano-convex polymer collimating lens 16 and the plano-convex polymer focusing lens 22, as well as any other polymer collimating/ focusing lens described herein as being used in WDM devices in accordance with the present invention, are typically coated with an anti-reflection material to prevent losses due to surface reflections. Another benefit of using polymer materials for the collimating/focusing lenses is that, in contrast to standard optical glass lenses which are typically coated under high heat and high vacuum, polymer lenses are typically coated under lower temperature and lower vacuum.

Figure 2A:
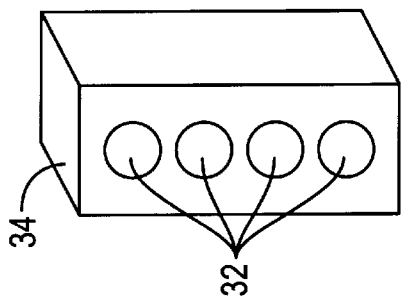

At this point it should be noted that the plurality of optical input fibers 12 could be replaced in the multiplexing device 10 by a corresponding plurality of laser diodes 32 secured within a coupling device 34, such as shown in FIG. 2a. The coupling device 34 performs a similar function to the input fiber coupling device 14, that being to precisely group the plurality of laser diodes 32 into a one-dimensional input array. The plurality of laser diodes 32 are used in place of the plurality of optical input fibers 12 to transmit the plurality of monochromatic optical input beams 28 to the multiplexing device 10. The array of laser diodes 32 may operate alone, or may be used with appropriate focusing lenses to provide the best coupling and the lowest amount of signal loss and channel crosstalk.

Figure 3:
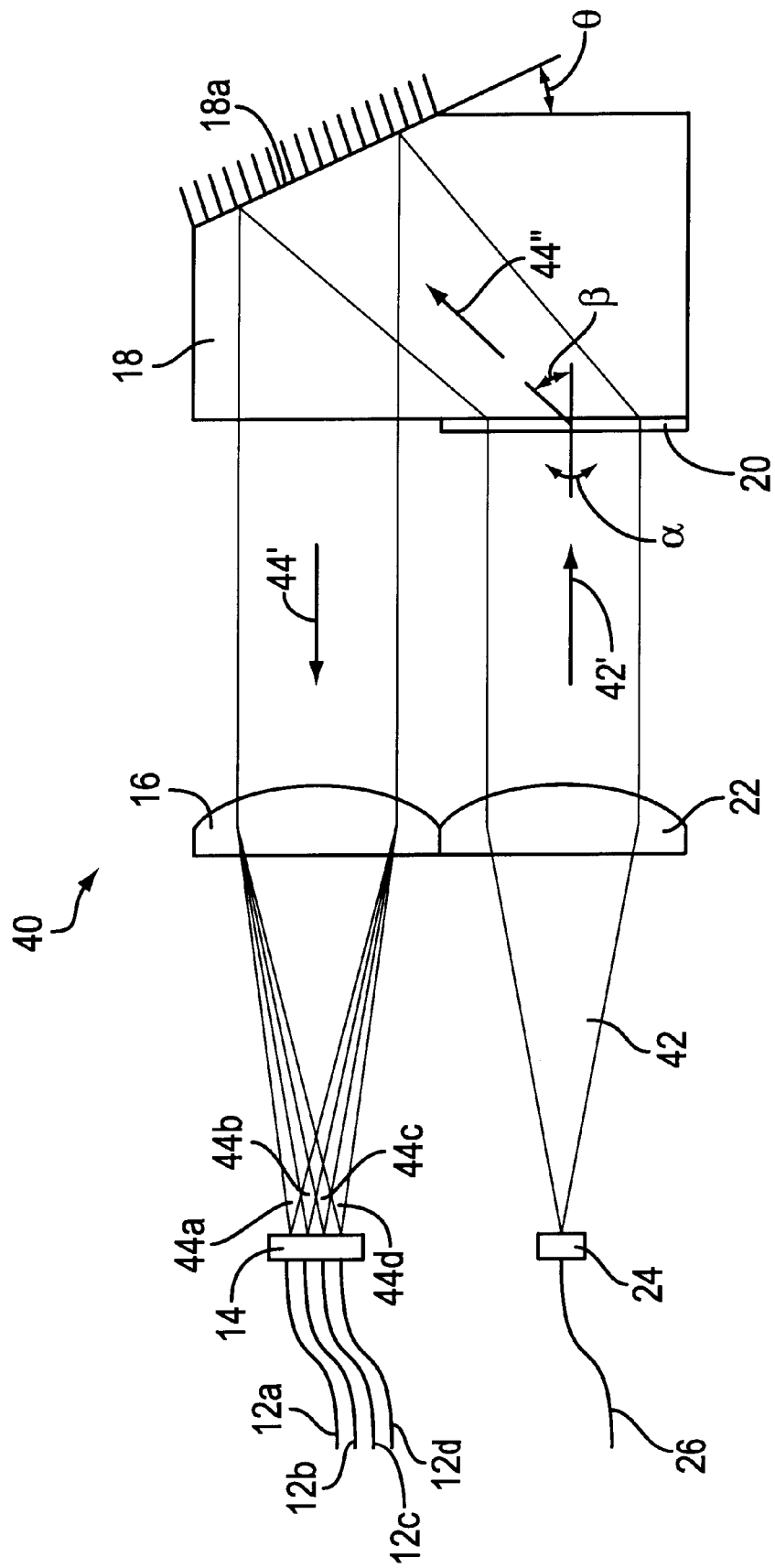
FIG. 3 is a side view of a wavelength division demultiplexing device having dual plano-convex polymer collimating/focusing lenses and a transmissive diffraction grating in accordance with the present invention.

At this point it should be noted that the multiplexing device 10, as well as all of the multiplexing devices described herein, may be operated in a converse configuration as a demultiplexing device 40, such as shown in FIG. 3. The demultiplexing device 40 is physically identical to the multiplexing device 10, and is therefore numerically identified as such. However, the demultiplexing device 40 is functionally opposite to the multiplexing device 10, wherein the plano-convex polymer collimating lens 16 now functions as a plano-convex polymer focusing lens 16 and the plano-convex polymer focusing lens 22 now functions as a plano-convex polymer collimating lens 22. That is, a single multiplexed, polychromatic optical input beam 42 is transmitted from the single optical fiber 26, and a plurality of monochromatic optical output beams 44 are transmitted to the plurality of optical fibers 12, wherein each one of the plurality of monochromatic optical output beams 44 is transmitted to a corresponding one of the plurality of optical fibers 12. The single multiplexed, polychromatic optical input beam 42 is simultaneously carrying a plurality of channels of data, each at a unique wavelength which is preferably, but not required to be, within the infrared (IR) region of the electromagnetic spectrum. The plurality of monochromatic optical output beams 44 are each carrying a single channel of data at a corresponding one of the unique wavelengths of the single multiplexed, polychromatic optical input beam 42. In this case, the single multiplexed, polychromatic optical input beam 42 is separated into the plurality of monochromatic optical output beams 44 through the combined operation of the plano-convex polymer collimating lens 22, the transmissive diffraction grating 20, and the plano-convex polymer focusing lens 16. That is, the plano-convex polymer collimating lens 22 collimates the single multiplexed, polychromatic optical input beam 42 to provide a single collimated, multiplexed, polychromatic optical input beam 42'. The transmissive diffraction grating 20 spatially separates the single collimated, multiplexed, polychromatic optical input beam 42' into a plurality of collimated, monochromatic optical input beams 44", which are reflected off the reflecting surface 18a to provide a plurality of reflected, collimated, monochromatic optical input beams 44'. The plano-convex polymer focusing lens 16 focuses the plurality of reflected, collimated, monochromatic optical input beams 44' to provide the plurality of monochromatic optical output beams 44. Thus, the plano-convex polymer collimating lens 22, the transmissive diffraction grating 20, and a plano-convex polymer focusing lens 16 operate to perform a demultiplexing function. Of course, in this case, the incident angle, α, and the diffraction angle, β, are reversed in comparison to the multiplexing device 10 shown in FIG. 1a, and the reflecting angle, θ, is equal to one-half of the diffraction angle, β.

Figure 2B:
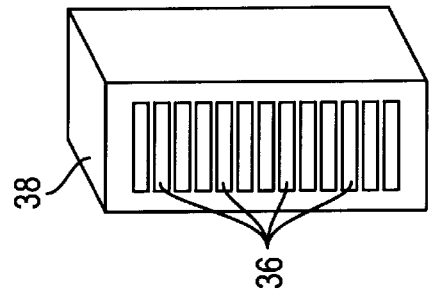
FIG. 2b is a perspective view of a coupling device containing a plurality of photodetectors for replacing the plurality of optical input fibers in the demultiplexing device shown in FIG. 3.

At this point it should be noted that the plurality of optical fibers 12 could be replaced in the demultiplexing device 40 by a corresponding plurality of photodetectors 36 secured within a coupling device 38, such as shown in FIG. 2b. The coupling device 38 performs a similar function to the fiber coupling device 14, that being to precisely group the plurality of photodetectors 36 into a one-dimensional output array. The plurality of photodetectors 36 are used in place of the plurality of optical fibers 12 to receive the plurality of monochromatic optical output beams 44 from the demultiplexing device 40. The array of photodetectors 36 may operate alone, or may be used with appropriate focusing lenses to provide the best coupling and the lowest amount of signal loss and channel crosstalk.

Figure 4:
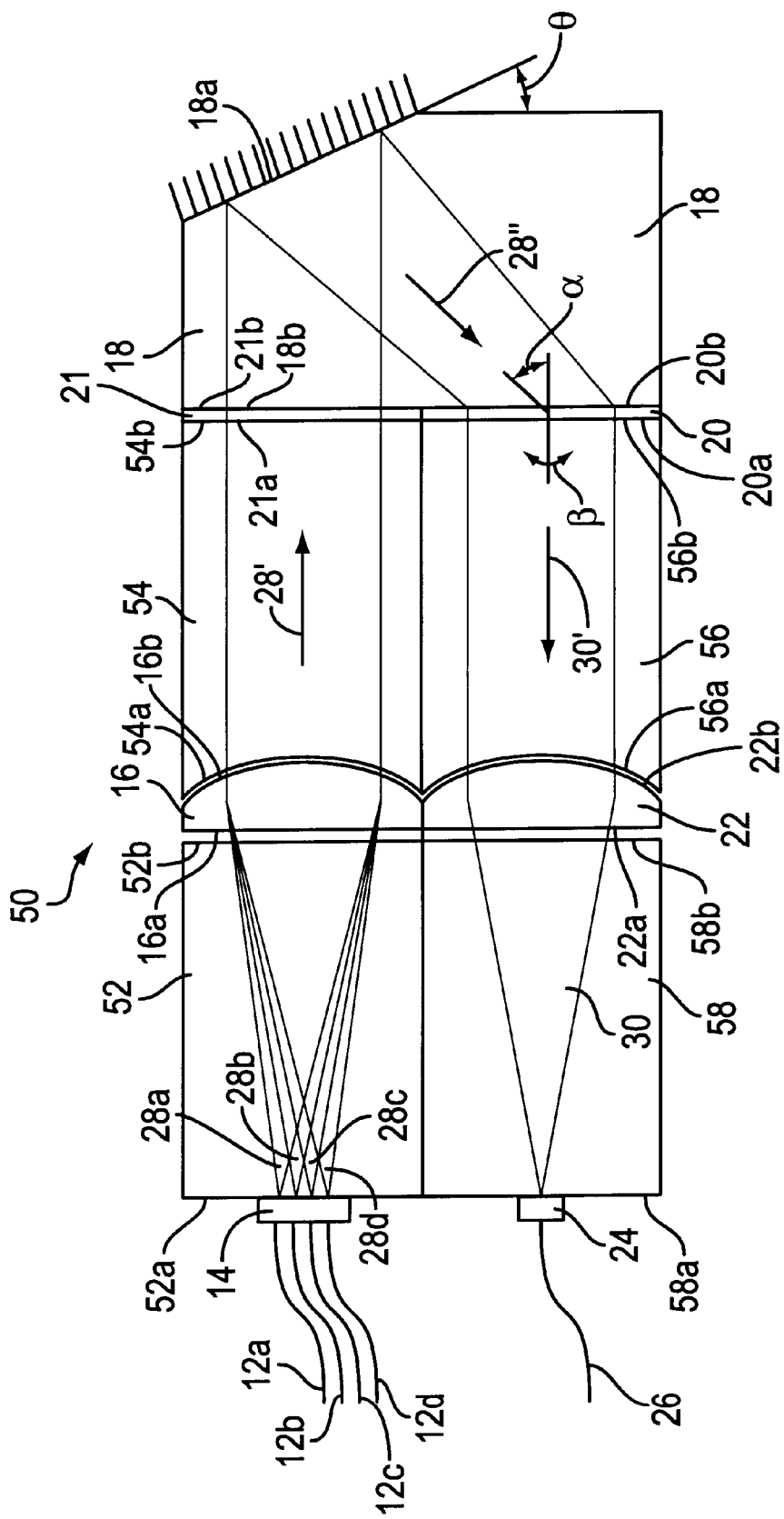
FIG. 4 is a side view of an integrated wavelength division multiplexing device having dual plano-convex polymer collimating/focusing lenses and a transmissive diffraction grating in accordance with the present invention.

Referring to FIG. 4, there is shown a side view of an alternate embodiment of a wavelength division multiplexing device 50 in accordance with the present invention. The multiplexing device 50 is physically identical to the multiplexing device 10, except for the addition of a first boot lens 52 between the input fiber coupling device 14 and the plano-convex polymer collimating lens 16, a second boot lens 54 and an optional spacer 21 between the plano-convex polymer collimating lens 16 and the reflecting element 18, a third boot lens 56 between the transmissive diffraction grating 20 and the plano-convex polymer focusing lens 22, and a fourth boot lens 58 between the plano-convex polymer focusing lens 22 and the output fiber coupling device 24.

The first boot lens 52, the second boot lens 54, the third boot lens 56, and the fourth boot lens 58 may be formed of a variety of types of materials including, but not limited to, glass, polymer, and crystalline materials. It should be noted, however, that it is preferable to have as large a difference as possible between the index of refraction values of the plano-convex polymer collimating lens 16 and the plano-convex polymer focusing lens 22 and the index of refraction values of the materials directly adjacent to the plano-convex polymer collimating lens 16 and the plano-convex polymer focusing lens 22. This large difference between the index of refraction values of the plano-convex polymer collimating lens 16 and the plano-convex polymer focusing lens 22 and the index of refraction values of the materials directly adjacent to the plano-convex polymer collimating lens 16 and the plano-convex polymer focusing lens 22 allows for the highly efficient collimation and focusing of the input optical beams 28 and output optical beam 30 by the plano-convex polymer collimating lens 16 and the plano-convex polymer focusing lens 22, respectively, while simultaneously minimizing the amount of wavelength distortion that is introduced into the optical system of the multiplexing device 50 by these lenses 16 and 22. Thus, for example, if the plano-convex polymer collimating lens 16 has a relatively high index of refraction value, then it is preferable that the first boot lens 52 and the second boot lens 54 have relatively low index of refraction values. In one particular example, the plano-convex polymer collimating lens 16 and the plano-convex polymer focusing lens 22 could be formed of acrylic polymer (monomer manufactured by BASF Corporation with a polymer refractive index n=1.481@1550 nm), and the first boot lens 52, the second boot lens 54, the third boot lens 56, and the fourth boot lens 58 could be formed of fused silica (manufactured by Schott Glass Technologies, Inc. with n=1.444@1550 nm).

The optional spacer 21 can also be formed of a variety of types of materials including, but not limited to, glass, polymer, and crystalline materials. However, there are not necessarily any preferences regarding the index of refraction value of the optional spacer 21. For example, the optional spacer 21 could be formed of the same material as the second boot lens 54 or the reflecting element 18. Thus, in one particular example, the optional spacer 21 could also be formed of fused silica (manufactured by Schott Glass Technologies, Inc. with n=1.444@1550 nm). The optional spacer is mainly used to maintain the spacing and alignment between the various parts of the multiplexing device 50.

The first boot lens 52 has a planar front surface 52a for mating with the input fiber coupling device 14 and the associated secured optical input fibers 12. The input fiber coupling device 14 and the secured optical input fibers 12 may be either abutted against the planar front surface 52a or affixed to the planar front surface 52a using optical cement or some other optically transparent bonding technique, depending upon system mobility requirements and optical beam alignment and loss considerations.

The first boot lens 52 also has a planar back surface 52b for mating with a planar front surface 16a of the plano-convex polymer collimating lens 16. The planar back surface 52b of the first boot lens 52 is typically joined or affixed to the planar front surface 16a of the plano-convex polymer collimating lens 16 using optical cement or some other optically transparent bonding technique.

The second boot lens 54 has a concave front surface 54a for mating with a convex back surface 16b of the plano-convex polymer collimating lens 16. The concave front surface 54a of the second boot lens 54 is typically joined or affixed to the convex back surface 16b of the plano-convex polymer collimating lens 16 using optical cement or some other optically transparent bonding technique.

The second boot lens 54 also has a planar back surface 54b for mating with a planar front surface 21a of the optional spacer 21. The planar back surface 54b of the second boot lens 54 is typically joined or affixed to the planar front surface 21a of the optional spacer 21 using optical cement or some other optically transparent bonding technique.

The optional spacer 21 is typically has a planar back surface 21b for typically mating with a planar interface surface 18b of the reflecting element 18. The planar back surface 21b of the optional spacer 21 is typically joined or affixed to the planar interface surface 18b of the reflecting element 18 using optical cement or some other optically transparent bonding technique.

At this point it should be noted that, instead of the optional spacer 21, the planar back surface 54b of the second boot lens 54 could be extended to the planar interface surface 18b of the reflecting element 18 if such additional spacing is beneficially required or desired. Also, the planar interface surface 18b of the reflecting element 18 could be extended in one area to the planar back surface 54b of the second boot lens 54 if such additional spacing is beneficially required or desired.

Similar to the first boot lens 52, the fourth boot lens 58 has a planar front surface 58a for mating with the output fiber coupling device 24 and the associated secured optical output fiber 26. The output fiber coupling device 24 and the secured optical output fiber 26 may be either abutted against the planar front surface 58a or affixed to the planar front surface 58a using optical cement or some other optically transparent bonding technique, depending upon system mobility requirements and optical beam alignment and loss considerations.

The fourth boot lens 58 also has a planar back surface 58b for mating with a planar front surface 22a of the plano-convex polymer focusing lens 22. The planar back surface 58b of the fourth boot lens 58 is typically joined or affixed to the planar front surface 22a of the plano-convex polymer focusing lens 22 using optical cement or some other optically transparent bonding technique.

Similar to the second boot lens 54, the third boot lens 56 has a concave front surface 56a for mating with a convex back surface 22b of the plano-convex polymer focusing lens 22. The concave front surface 56a of the third boot lens 56 is typically joined or affixed to the planar back surface 22b of the plano-convex polymer focusing lens 22 using optical cement or some other optically transparent bonding technique.

The third boot lens 56 also has a planar back surface 56b for typically mating with a planar front surface 20a of the transmissive diffraction grating 20. The planar back surface 56b of the third boot lens 56 is typically joined or affixed to the planar front surface 20a of the transmissive diffraction grating 20 using optical cement or some other optically transparent bonding technique.

The transmissive diffraction grating 20 typically has a planar back surface 20b for typically mating with the planar interface surface 18b of the reflecting element 18. The planar back surface 20b of the transmissive diffraction grating 20 is typically joined or affixed to the planar interface surface 18b of the reflecting element 18 using optical cement or some other optically transparent bonding technique.

At this point it should be noted that, as with the multiplexing device 10, the transmissive diffraction grating 20 can be formed directly on the planar interface surface 18b of the reflecting element 18, thereby avoiding the joining or affixing of the transmissive diffraction grating 20 to the reflecting element 18 or the third boot lens 56, and also avoiding the need for the optional spacer 21. Alternatively, the transmissive diffraction grating 20 can be formed directly on the planar back surface 56b of the third boot lens 56, thereby avoiding the joining or affixing of the transmissive diffraction grating 20 to the reflecting element 18 or the third boot lens 56, and also avoiding the need for the optional spacer 21.

In any of the above-described cases, the transmissive diffraction grating 20 is integrated along with at least the reflecting element 18, the plano-convex polymer collimating lens 16, the plano-convex polymer focusing lens 22, and the boot lenses 52, 54, 56, and 58, to form a compact, rigid, and environmentally and thermally stable multiplexing device 50. The integrated nature of this multiplexing device 50 is particularly useful for maintaining component alignment, which provides long-term performance in contrast to some non-integrated air-spaced devices that characteristically degrade in alignment and therefore performance over time.

The multiplexing device 50 is functionally identical to the multiplexing device 10, except for a slight decrease in optical beam transmission efficiency due to the addition of the boot lenses 52, 54, 56, and 58, and the optional spacer 21. However, even with this slight decrease in optical beam transmission efficiency, the optical performance of the multiplexing device 50 is still exceptional due to the precise imaging of both the input optical beams 28 and output optical beam 30 within the multiplexing device 50 through the use of the plano-convex polymer collimating lens 16 and the plano-convex polymer focusing lens 22.

Figure 5:
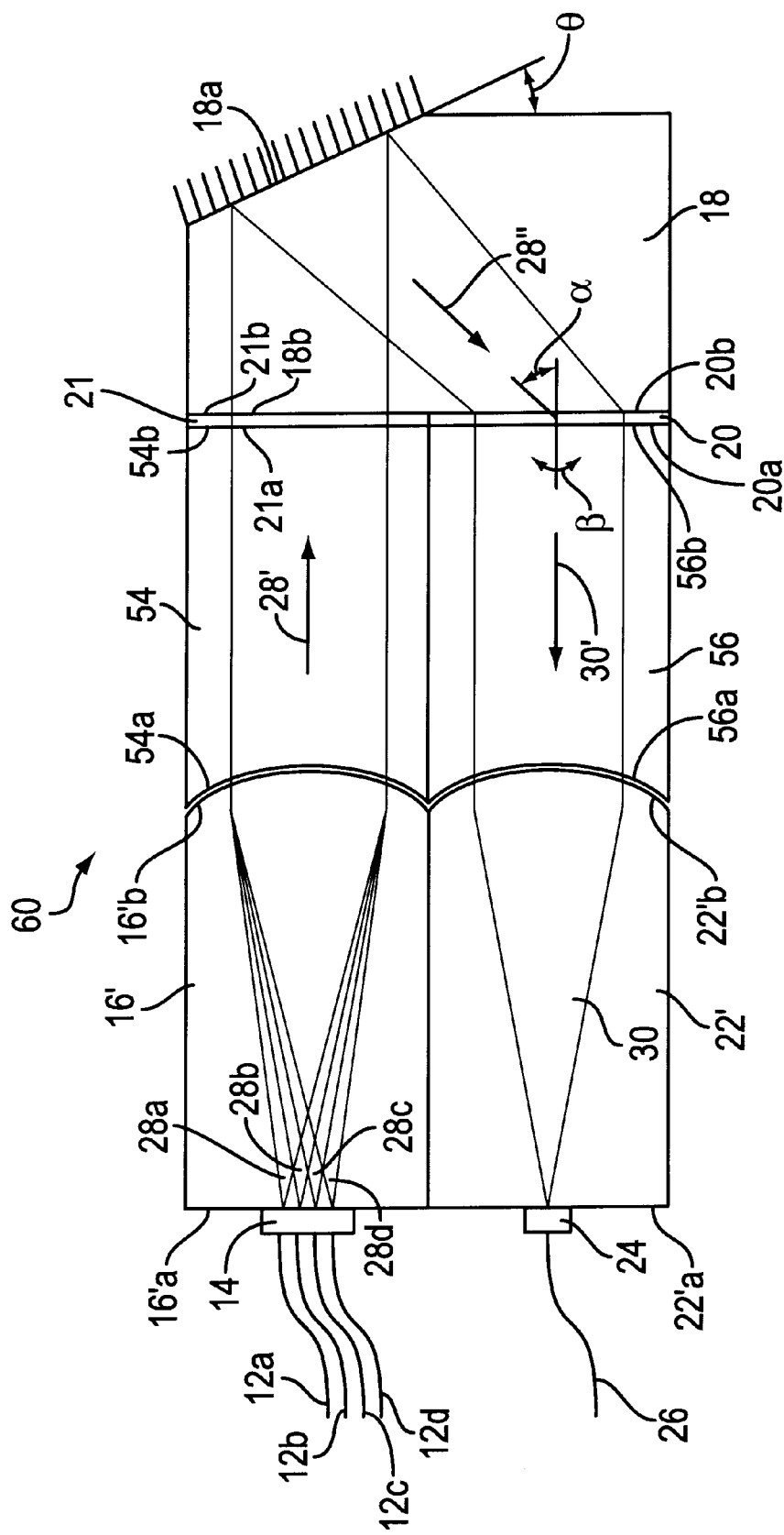
FIG. 5 is a side view of an integrated wavelength division multiplexing device having dual extended plano-convex polymer collimating/focusing lenses and a transmissive diffraction grating in accordance with the present invention.

Referring to FIG. 5, there is shown a side view of an alternate embodiment of a wavelength division multiplexing device 60 in accordance with the present invention. The multiplexing device 60 is physically identical to the multiplexing device 50, except that the first boot lens 52 has been removed and the planar front surface 16'a of the plano-convex polymer collimating lens 16' has been extended so as to allow the input fiber coupling device 14 and the secured optical input fibers 12 to be either abutted against the planar front surface 16'a or affixed to the planar front surface 16'a using optical cement or some other optically transparent bonding technique, depending upon system mobility requirements and optical beam alignment and loss considerations, and that the fourth boot lens 58 has been removed and the planar front surface 22'a of the plano-convex polymer focusing lens 22' has been extended so as to allow the output fiber coupling device 24 and the secured optical output fiber 26 to be either abutted against the planar front surface 22'a or affixed to the planar front surface 22'a using optical cement or some other optically transparent bonding technique, depending upon system mobility requirements and optical beam alignment and loss considerations. Similar to the multiplexing device 50, the integrated nature of the multiplexing device 60 is particularly useful for maintaining component alignment, which provides long-term performance in contrast to some non-integrated air-spaced devices that characteristically degrade in alignment and therefore performance over time. The multiplexing device 60 is functionally identical to the multiplexing device 50, except for a slight increase in optical beam transmission efficiency due to the removal of the first boot lens 52 and the fourth boot lens 58.

Figure 6:
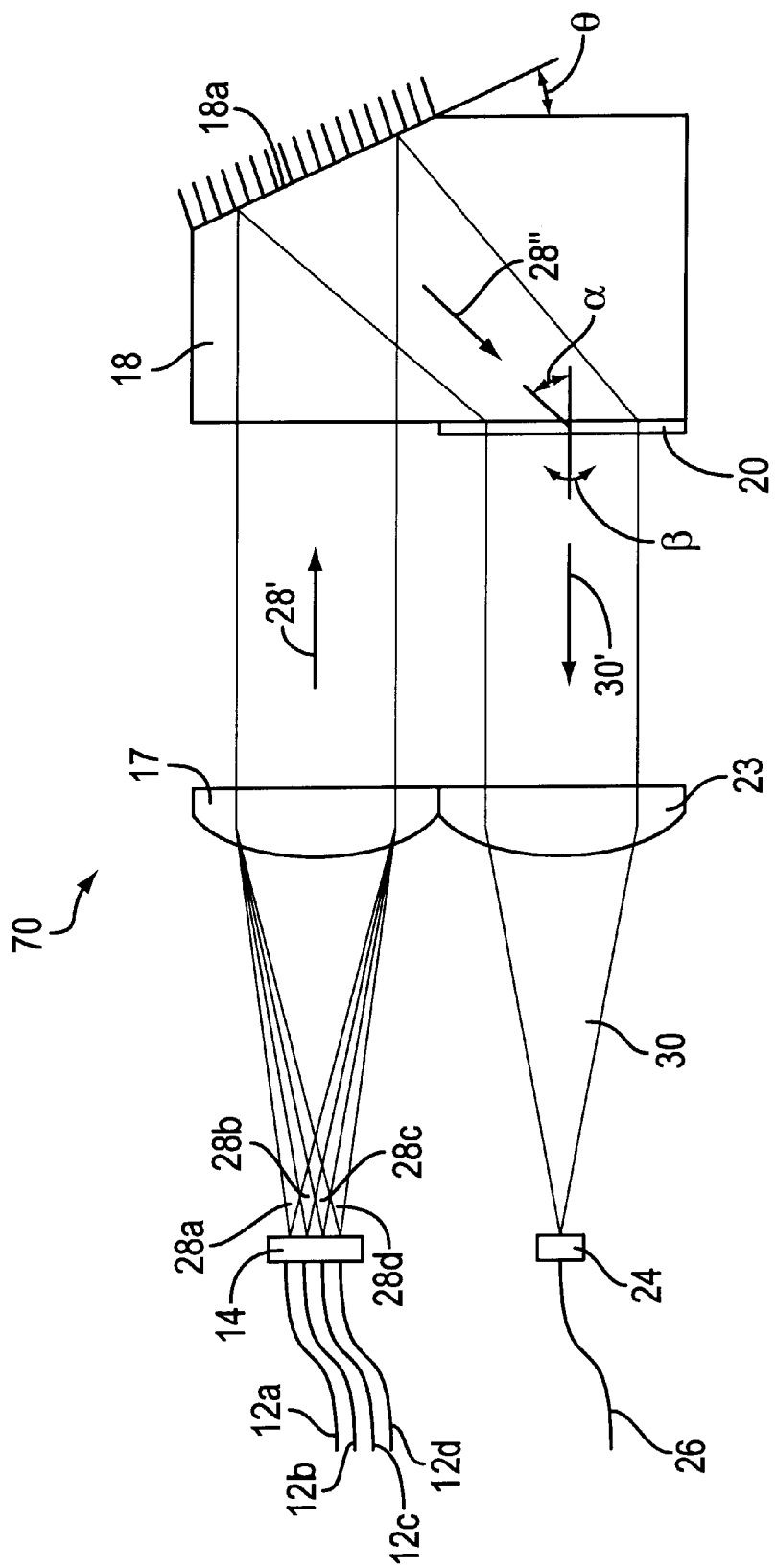
FIG. 6 is a side view of a wavelength division multiplexing device having dual convex-plano polymer collimating/focusing lenses and a transmissive diffraction grating in accordance with the present invention.

At this point it should be noted that the plano-convex polymer collimating lens 16 and/or the plano-convex polymer focusing lens 22, as shown in the multiplexing device 10 of FIG. 1, may be replaced by a convex-plano polymer collimating lens 17 and/or a convex-plano polymer focusing lens 23, respectively, to form an alternate embodiment of a wavelength division multiplexing device 70 in accordance with the present invention as shown in FIG. 6. The multiplexing device 70 of FIG. 6 realizes the above-described benefits of using a polymer material to form the plano-convex polymer collimating lens 16 and the plano-convex polymer focusing lens 22 in the multiplexing device 10 of FIG. 1. That is, the above-described benefits of using a polymer material to form the plano-convex polymer collimating lens 16 and the plano-convex polymer focusing lens 22 in multiplexing device 10 of FIG. 1 are also realized when using a polymer material to form the convex-plano polymer collimating lens 17 and/or the convex-plano polymer focusing lens 23 in multiplexing device 70 of FIG. 6. The multiplexing device 70 is functionally identical to the multiplexing device 10.

Figure 7:
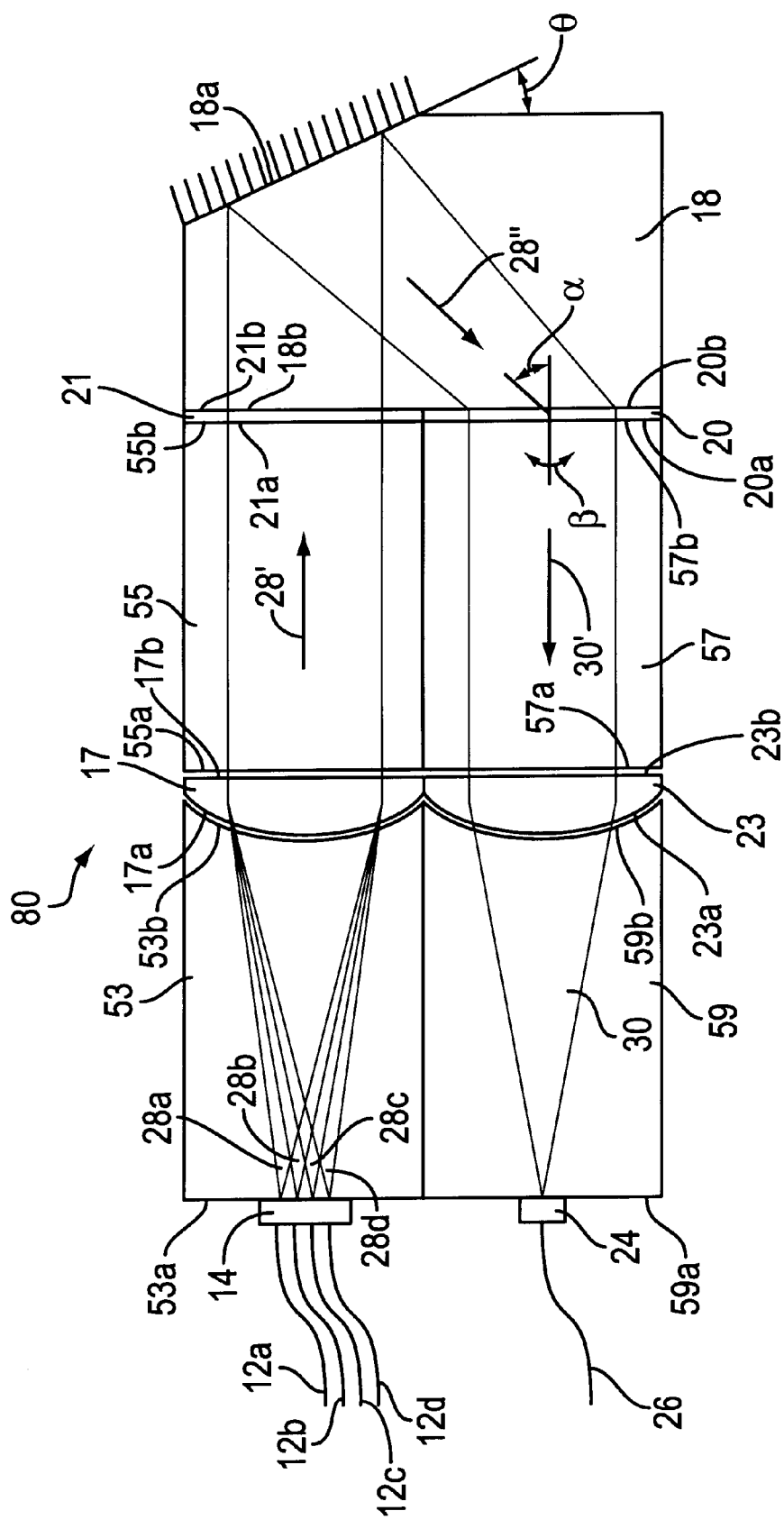
FIG. 7 is a side view of an integrated wavelength division multiplexing device having dual convex-plano polymer collimating/focusing lenses and a transmissive diffraction grating in accordance with the present invention.

At this point it should be noted, similar to the multiplexing device 50 of FIG. 4, boot lenses can be added to the multiplexing device 70 of FIG. 6 to form an alternate embodiment of a wavelength division multiplexing device 80 in accordance with the present invention as shown in FIG. 7. The multiplexing device 80 of FIG. 7 realizes the above-described benefits of using boot lenses in the multiplexing device 50 of FIG. 4. That is, the above-described benefits of using the first boot lens 52, the second boot lens 54, the third boot lens 56, and the fourth boot lens 58 in multiplexing device 50 of FIG. 4 are also realized when using a first boot lens 53, a second boot lens 55, a third boot lens 57, and a fourth boot lens 59 in multiplexing device 80 of FIG. 7. As with all of the previously described embodiments, the transmissive diffraction grating 20 can be formed using a separate material, and this material can then be joined or affixed to the planar back surface 57b of the boot lens 57 and to the planar interface surface 18b of the reflecting element 18 using optical cement or some other optically transparent bonding technique. Alternatively, the transmissive diffraction grating 20 can be formed directly on the planar back surface 57b of the boot lens 57 or on the planar interface surface 18b of the reflecting element 18, thereby avoiding the joining or affixing of the transmissive diffraction grating 20 to the planar back surface 57b of the boot lens 57 and to the planar interface surface 18b of the reflecting element 18. Similar to the multiplexing device 50, the integrated nature of the multiplexing device 80 is particularly useful for maintaining component alignment, which provides long-term performance in contrast to some non-integrated air-spaced devices that characteristically degrade in alignment and therefore performance over time. The multiplexing device 80 is functionally identical to the multiplexing device 50.

Figure 8:
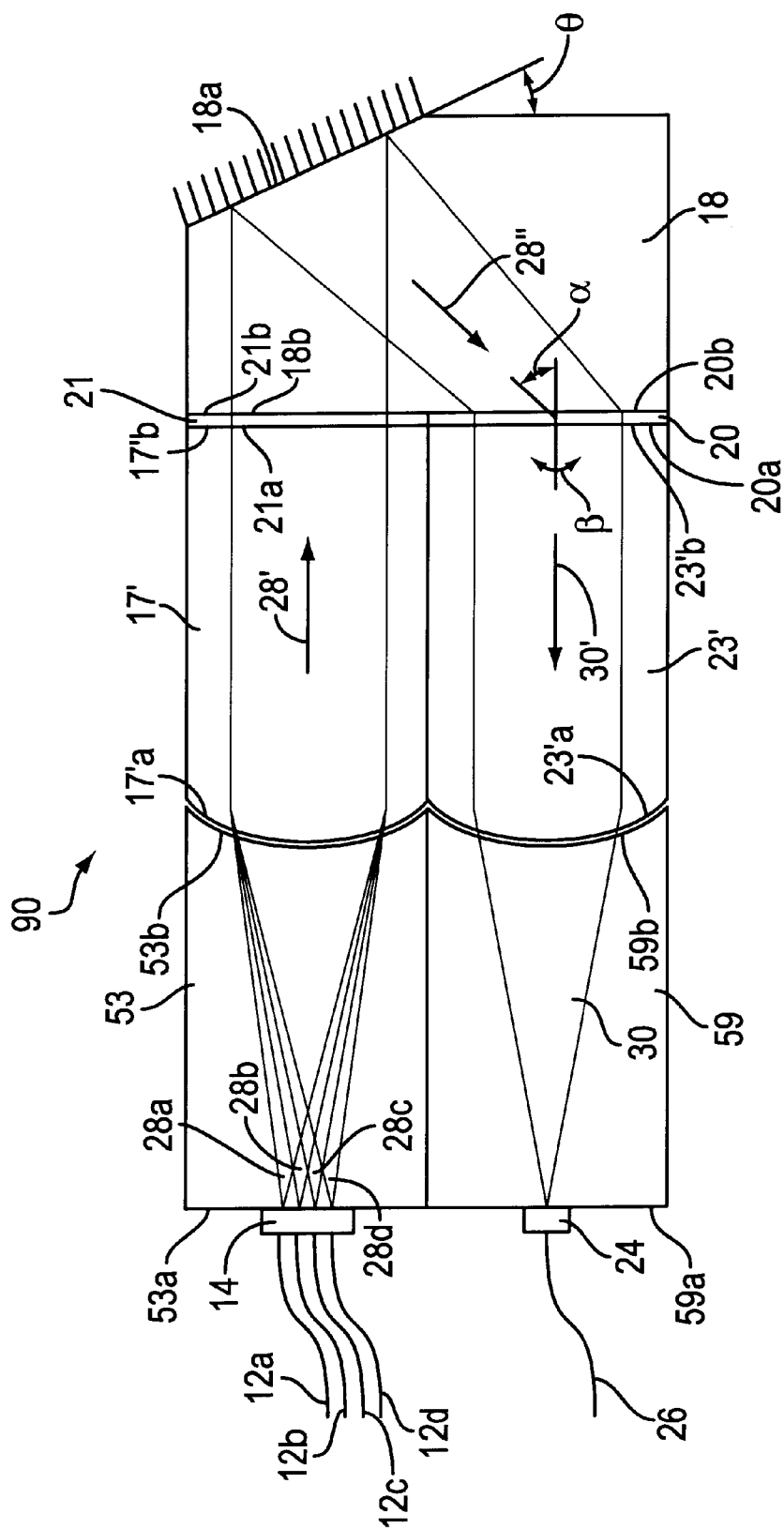
FIG. 8 is a side view of an integrated wavelength division multiplexing device having dual extended convex-plano polymer collimating/focusing lenses and a transmissive diffraction grating in accordance with the present invention.

At this point it should be noted that the second boot lens 55 and the third boot lens 57 can be removed from the multiplexing device 80 of FIG. 7, and the back surface 17'b of the convex-plano polymer collimating lens 17' can be extended out to the optional spacer 21 and the back surface 23'b of the convex-plano polymer focusing lens 23' can be extended out to the transmissive diffraction grating 20, respectively, to form an alternate embodiment of a wavelength division multiplexing device 90 in accordance with the present invention as shown in FIG. 8. As with all of the previously described embodiments, the transmissive diffraction grating 20 can be formed using a separate material, and this material can then be joined or affixed to the planar back surface 23'b of the convex-plano polymer focusing lens 23' and to the planar interface surface 18b of the reflecting element 18 using optical cement or some other optically transparent bonding technique. Alternatively, the transmissive diffraction grating 20 can be formed directly on the planar back surface 23'b of the convex-plano polymer focusing lens 23' or on the planar interface surface 18b of the reflecting element 18, thereby avoiding the joining or affixing of the transmissive diffraction grating 20 to the planar back surface 23'b of the convex-plano polymer focusing lens 23' and to the planar interface surface 18b of the reflecting element 18. Similar to the multiplexing device 60, the integrated nature of the multiplexing device 90 is particularly useful for maintaining component alignment, which provides long-term performance in contrast to some non-integrated air-spaced devices that characteristically degrade in alignment and therefore performance over time. The multiplexing device 90 is functionally identical to the multiplexing device 60.

At this point it should be noted that any of the boot lenses 52, 54, 56, and 58 may be removed from the multiplexing device 50, either of the boot lenses 54, 56 may be removed from the multiplexing device 60, any of the boot lenses 53, 55, 57, and 59 may be removed from the multiplexing device 80, and either of the boot lenses 53, 59 may be removed from the multiplexing device 90, in order to create additional alternate embodiments (not shown) while still retaining the above-described benefits of using a polymer material to form the plano-convex polymer collimating lens 16, the convex-plano polymer collimating lens 17, the plano-convex polymer focusing lens 22, and the convex-plano polymer focusing lens 23.

Figure 9:
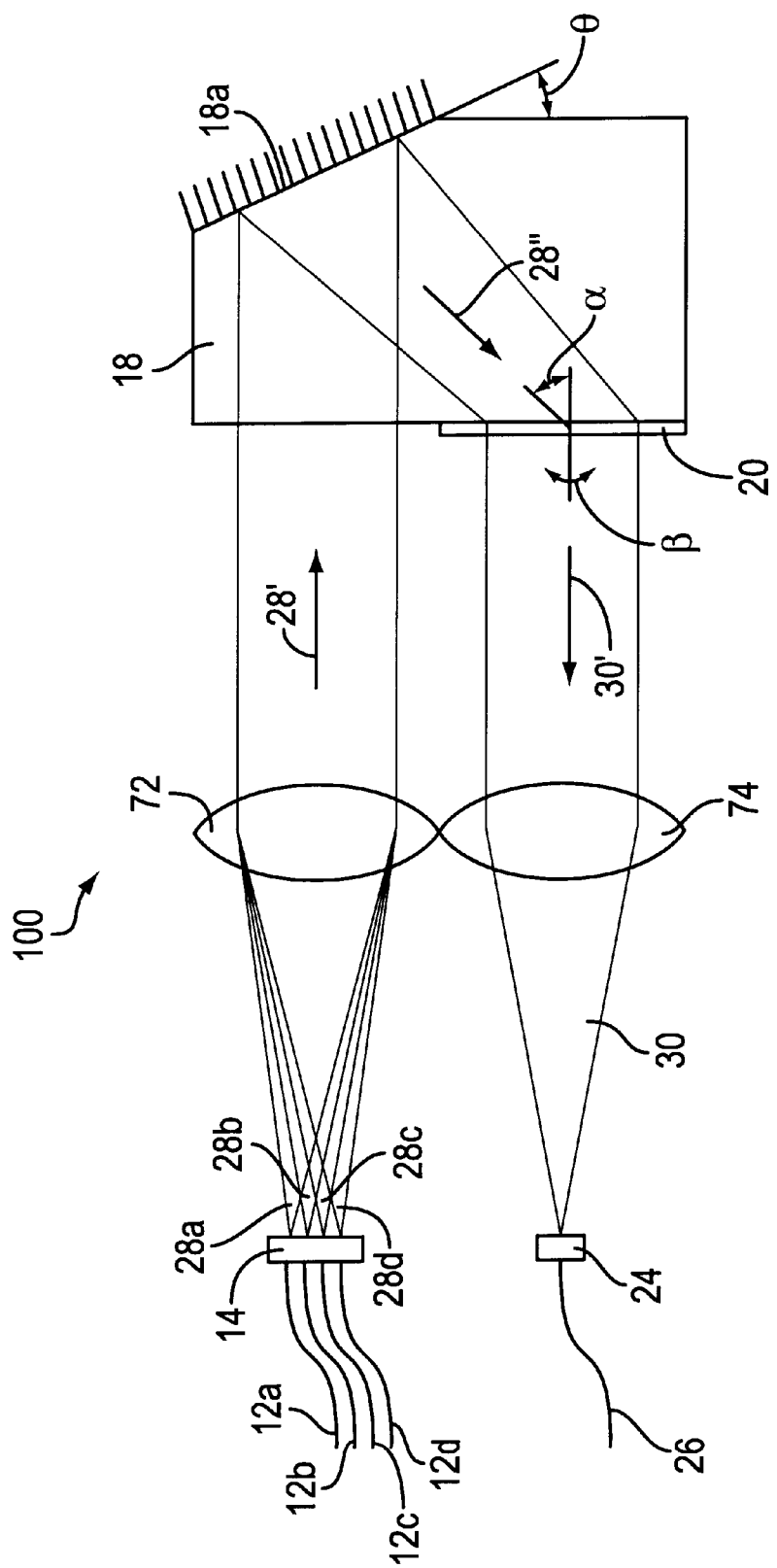
FIG. 9 is a side view of a wavelength division multiplexing device having dual bi-convex polymer collimating/focusing lenses and a transmissive diffraction grating in accordance with the present invention.

Referring to FIG. 9, there is shown a side view of an alternate embodiment of a wavelength division multiplexing device 100 in accordance with the present invention. The multiplexing device 100 is physically identical to the multiplexing device 10, except that the plano-convex polymer collimating lens 16 has been replaced by a bi-convex polymer collimating lens 72 and that the plano-convex polymer focusing lens 22 has been replaced by a bi-convex polymer focusing lens 74 so as to enhance the imaging of both the input optical beams 28 and output optical beam 30 within the multiplexing device 100. That is, the additional curved surfaces of the bi-convex polymer collimating lens 72 and the bi-convex polymer focusing lens 74 provides additional imaging capability, thereby increasing the fiber coupling efficiency (FCE) of the multiplexing device 100. In contrast to a measure of insertion loss, the FCE of a WDM device expresses the efficiency of only the optical system of the WDM device for each data channel, without taking into account the efficiency of the diffraction grating. Comparatively, the use of the bi-convex polymer collimating lens 72 and the bi-convex polymer focusing lens 74 instead of the plano-convex polymer collimating lens 16 and the plano-convex polymer focusing lens 22, respectively, typically results in an increase in the FCE of approximately 1% for the configuration of WDM devices shown in FIGS. 1 and 9. Of course, further increases in the FCE can typically be achieved using doublet, triplet, or even higher number lens configurations.

Figure 10:
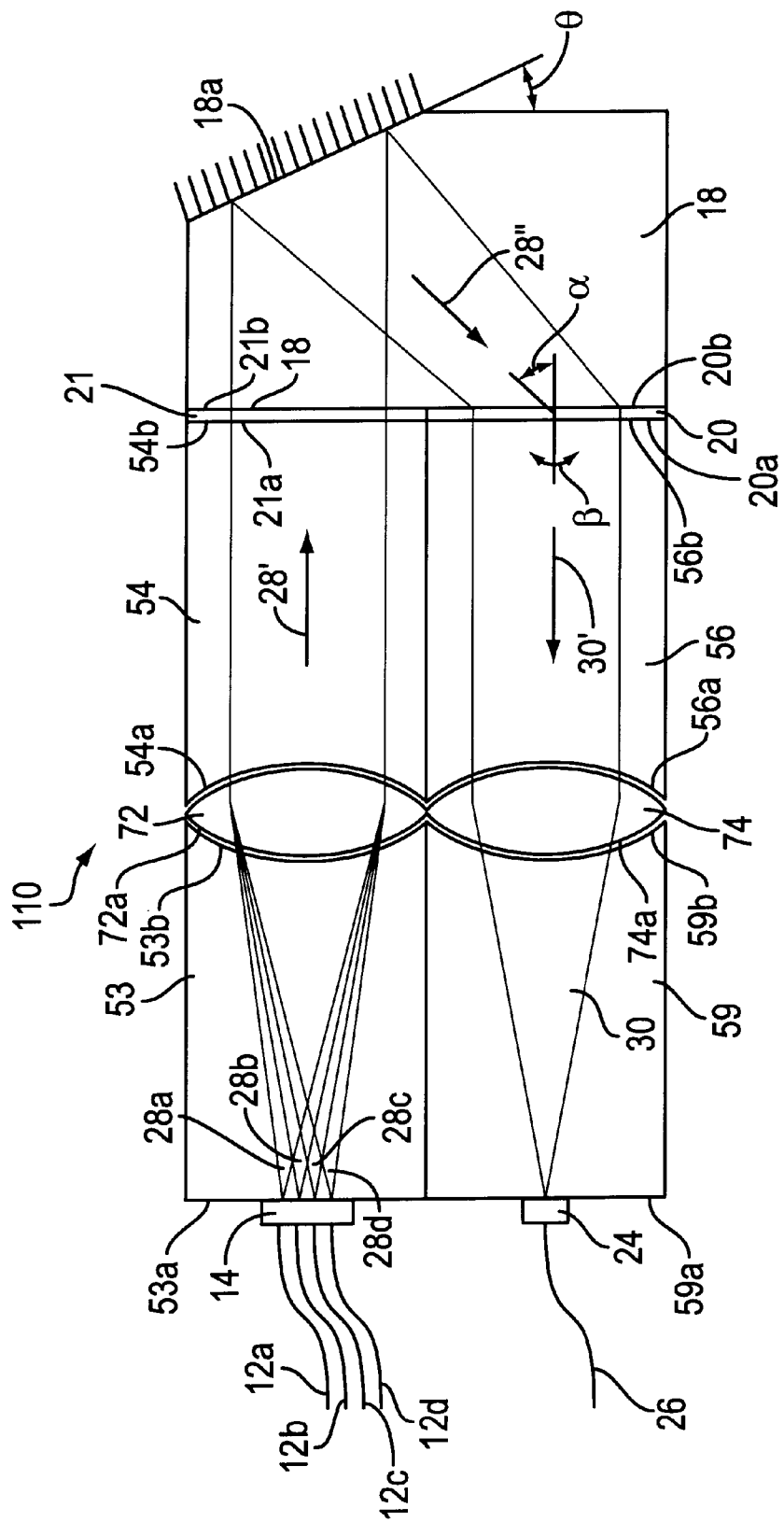
FIG. 10 is a side view of an integrated wavelength division multiplexing device having dual bi-convex polymer collimating/focusing lenses and a transmissive diffraction grating in accordance with the present invention.

Referring to FIG. 10, there is shown a side view of an alternate embodiment of a wavelength division multiplexing device 110 in accordance with the present invention. The multiplexing device 110 is physically identical to the multiplexing device 50, except that the plano-convex polymer collimating lens 16 has been replaced by a bi-convex polymer collimating lens 72, the first boot lens 52 has been replaced by the first boot lens 53, the plano-convex polymer focusing lens 22 has been replaced by a bi-convex polymer focusing lens 74, and the fourth boot lens 58 has been replaced by the fourth boot lens 59. As with the multiplexing device 100, the replacement of the plano-convex polymer collimating lens 16 with the bi-convex polymer collimating lens 72 and the replacement of the plano-convex polymer focusing lens 22 with the bi-convex polymer focusing lens 74 in the multiplexing device 110 has been done to enhance the imaging of both the input optical beams 28 and output optical beam 30 within the multiplexing device 110. The first boot lens 52 has been replaced with the first boot lens 53 because the first boot lens 53 has a concave back surface 53b for mating with the convex front surface 72a of the bi-convex polymer collimating lens 72. Similarly, the fourth boot lens 58 has been replaced with the fourth boot lens 59 because the fourth boot lens 59 has a concave back surface 59b for mating with the convex front surface 74a of the bi-convex polymer focusing lens 74.

At this point it should be noted that, as with the multiplexing device 50, any of the boot lenses 53, 54, 56, and 59 may be removed from the multiplexing device 110 in order to create additional alternate embodiments (not shown) while still retaining the above-described benefits of using a polymer material to form the bi-convex polymer collimating lens 72 and the bi-convex polymer focusing lens 74. Also, the bi-convex polymer collimating lens 72 and/or the bicon-vex polymer focusing lens 74 can be replaced with a plano-convex polymer lens(es), or a polymer collimating/focusing doublet, triplet, or even higher number lens configuration, in the multiplexing device 110 in accordance with the practices described above.

Figure 11:
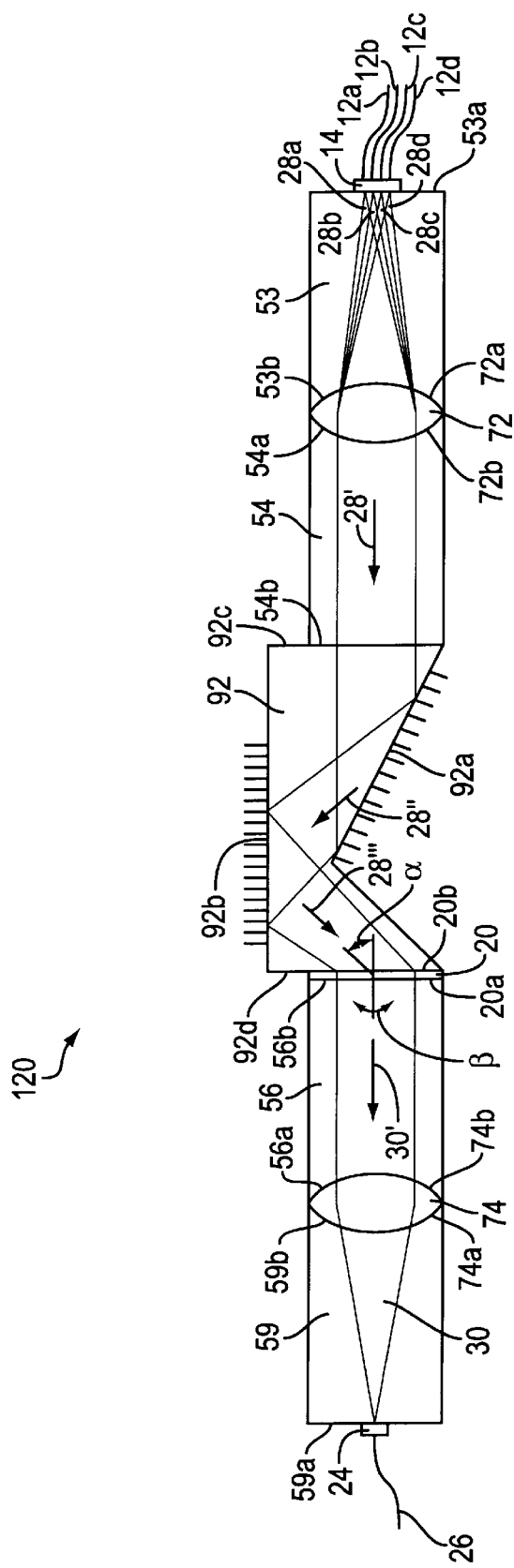
FIG. 11 is a side view of an integrated in-line wavelength division multiplexing device having dual bi-convex polymer lenses, a transmissive diffraction grating, and a reflecting element in accordance with the present invention.

Referring to FIG. 11, there is shown a side view of an alternate embodiment of a wavelength division multiplexing device 120 in accordance with the present invention. The multiplexing device 120 differs from the previously described embodiments by having an in-line geometry rather than the folded geometry of the previously described embodiments. This in-line geometry is achieved through the use of a dual reflecting element 92, which has a first reflecting surface 92a for reflecting the plurality of collimated, monochromatic optical input beams 28' and a second reflecting surface 92b for reflecting the plurality of reflected, collimated, monochromatic optical input beams 28". Note that, in contrast to the previously described embodiments, the multiplexing device 120 does not require the optional spacer 21 to maintain the spacing and alignment between the various parts of the multiplexing device 120. Otherwise, the multiplexing device 120 is functionally identical to and utilizes all of the components used in the multiplexing device 110, except of course the reflecting element 18.

At this point it should be noted that, as with the multiplexing device 50 and the multiplexing device 80, any of the boot lenses 53, 54, 56, and 59 may be removed from the multiplexing device 120 in order to create additional alternate embodiments (not shown) while still retaining the above-described benefits of using a polymer material to form the bi-convex polymer collimating lens 72 and the bi-convex polymer focusing lens 74. Also, the bi-convex polymer collimating lens 72 and/or the bi-convex polymer focusing lens 74 can be replaced with a plano-convex polymer lens(es), or a polymer collimating/focusing doublet, triplet, or even higher number lens configuration, in the multiplexing device 120 in accordance with the practices described above. The benefits and detriments associated with using these substitute/additional components are applicable to the multiplexing device 120 as would be the case with the previously described embodiments. Of course, the most significant benefits come from the use of polymer materials for the lenses. That is, regardless of embodiment, the use of polymer materials for lenses in WDM devices can lead to increased device performance, as well as reduced device cost, complexity, and manufacturing risk. Simply said, the use of polymer lenses allows for the construction of a family of simple, low cost, yet very powerful WDM devices, particularly for use in DWDM (i.e., high channel number) applications.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A wave length division multiplexing device comprising:
   a polymer collimating lens for collimating a plurality of monochromatic optical beams;
   a diffraction grating for combining the plurality of collimated, monochromatic optical beams into a multiplexed, polychromatic optical beam; and
   a polymer focusing lens for focusing the multiplexed, polychromatic optical beam.

2. The device as defined in claim 1, wherein the diffraction grating is a transmissive diffraction grating.

3. The device as defined in claim 2, further comprising:
   a transmissive element associated with the transmissive diffraction grating, the transmissive element having at least one reflective surface for reflecting the multiplexed, polychromatic optical beam.

4. The device as defined in claim 2, further comprising:
   a transmissive element associated with the transmissive diffraction grating, the transmissive element having at least one reflective surface for reflecting the plurality of collimated, monochromatic optical beams.

5. The device as defined in claim 1, wherein the polymer collimating lens and the polymer focusing lens operate in the infrared region of the electromagnetic spectrum.

6. The device as defined in claim 1, wherein at least one of the polymer collimating lens and the polymer focusing lens is a piano-convex lens or a convex-piano lens.

7. The device as defined in claim 1, wherein at least one of the polymer collimating lens and the polymer focusing lens is a bi-convex lens.

8. The device as defined in claim 1, wherein at least one of the polymer collimating lens and the polymer focusing lens is a spherical lens.

9. The device as defined in claim 1, wherein at least one of the polymer collimating lens and the polymer focusing lens is an aspherical lens.

10. The device as defined in claim 1, wherein the polymer collimating lens and the polymer focusing lens are formed of a polymer material selected from the group consisting of acrylic, styrene, polycarbonate, copolymers thereof, and other polymer materials that efficiently transmit optical beams in the infrared region of the electromagnetic spectrum.

11. An integrated wavelength division multiplexing device comprising:

a polymer collimating lens for collimating a plurality of monochromatic optical beams;

a boot lens affixed to the polymer collimating lens for transmitting the plurality of collimated, monochromatic optical beams from the polymer collimating lens, the boot lens having a planar exit surface; and a diffraction grating formed at the planar exit surface of the boot lens for combining the plurality of collimated, monochromatic optical beams into a multiplexed, polychromatic optical beam.

12. The device as defined in claim 11, wherein the boot lens is incorporated into the polymer collimating lens such that the polymer collimating lens has the planar exit surface at which the diffraction grating is formed.

13. The device as defined in claim 11, wherein the boot lens is a first boot lens, the device further comprising:

a second boot lens affixed to the polymer collimating lens for transmitting the plurality of monochromatic optical beams to the polymer collimating lens.

14. The device as defined in claim 13, wherein the second boot lens has a planar entry surface for accepting the plurality of monochromatic optical beams from at least one optical source.

15. The device as defined in claim 11, wherein the polymer collimating lens has a planar entry surface for accepting the plurality of monochromatic optical beams from at least one optical source.

16. The device as defined in claim 11, wherein the diffraction grating is a transmissive diffraction grating.

17. The device as defined in claim 16, further comprising:

a transmissive element associated with the transmissive diffraction grating, the transmissive element having at least one reflective surface for reflecting the multiplexed, polychromatic optical beam.

18. The device as defined in claim 17, wherein the boot lens is a first boot lens, the device further comprising:

a second boot lens affixed to the transmissive element for transmitting the multiplexed, polychromatic optical beam from the transmissive element; and a polymer focusing lens affixed to the second boot lens for focusing the multiplexed, polychromatic optical beam.

19. The device as defined in claim 18, wherein the second boot lens is incorporated into the polymer focusing lens such that the polymer focusing lens is affixed to the transmissive element.

20. The device as defined in claim 18, further comprising:

a third boot lens affixed to the polymer focusing lens for transmitting the focused, multiplexed, polychromatic optical beam from the polymer focusing lens.

21. The device as defined in claim 20, wherein the third boot lens has a planar exit surface for outputting the focused, multiplexed, polychromatic optical beam to at least one optical receiver.

22. The device as defined in claim 18, wherein the polymer focusing lens has a planar exit surface for outputting the focused, multiplexed, polychromatic optical beam to at least one optical receiver.

23. An integrated wavelength division multiplexing device comprising:

a polymer focusing lens for focusing a multiplexed, polychromatic optical beam;

a boot lens affixed to the polymer focusing lens for transmitting the multiplexed, polychromatic optical beam to the polymer focusing lens, the boot lens having a planar entry surface; and a diffraction grating formed at the planar entry surface of the boot lens for combining a plurality of monochromatic optical beams into the multiplexed, polychromatic optical beam.

24. The device as defined in claim 23, wherein the boot lens is incorporated into the polymer focusing lens such that the polymer focusing lens has the planar entry surface at which the diffraction grating is formed.

25. The device as defined in claim 23, wherein the diffraction grating is a transmissive diffraction grating.

26. The device as defined in claim 25, further comprising:

a transmissive element associated with the transmissive diffraction grating, the transmissive element having at least one reflective surface for reflecting the plurality of monochromatic optical beams toward the transmissive diffraction grating.

27. The device as defined in claim 26, wherein the boot lens is a first boot lens, the device further comprising:

a second boot lens affixed to the transmissive element for transmitting the plurality of monochromatic optical beams to the transmissive element; and a polymer collimating lens affixed to the second boot lens for collimating the plurality of monochromatic optical beams prior to transmission by the second boot lens.

28. The device as defined in claim 27, wherein the second boot lens is incorporated into the polymer collimating lens such that the polymer collimating lens is affixed to the transmissive element.

29. A wavelength division demultiplexing device comprising:

a polymer collimating lens for collimating a multiplexed, polychromatic optical beam;

a diffraction grating for separating the collimated, multiplexed, polychromatic optical beam into a plurality of monochromatic optical beams; and a polymer focusing lens for focusing the plurality of monochromatic optical beams.

30. The device as defined in claim 29, wherein the diffraction grating is a transmissive diffraction grating.

31. The device as defined in claim 30, further comprising:

a transmissive element associated with the transmissive diffraction grating, the transmissive element having at least one reflective surface for reflecting the collimated, multiplexed, polychromatic optical beam.

32. The device as defined in claim 30, further comprising:

a transmissive element associated with the transmissive diffraction grating, the transmissive element having at least one reflective surface for reflecting the plurality of monochromatic optical beams.

33. The device as defined in claim 29, wherein the polymer collimating lens and the polymer focusing lens operate in the infrared region of the electromagnetic spectrum.

34. The device as defined in claim 29, wherein at least one of the polymer collimating lens and the polymer focusing lens is a plano-convex lens or a convex-plano lens.

35. The device as defined in claim 29, wherein at least one of the polymer collimating lens and the polymer focusing lens is a bi-convex lens.

36. The device as defined in claim 29, wherein at least one of the polymer collimating lens and the polymer focusing lens is a spherical lens.

37. The device as defined in claim 29, wherein at least one of the polymer collimating lens and the polymer focusing lens is an aspherical lens.

38. The device as defined in claim 29, wherein the polymer collimating lens and the polymer focusing lens are formed of a polymer material selected from the group consisting of acrylic, styrene, polycarbonate, copolymers thereof, and other polymer materials that efficiently transmit optical beams in the infrared region of the electromagnetic spectrum.

39. An integrated wavelength division demultiplexing device comprising:

a polymer collimating lens for collimating a multiplexed, polychromatic optical beam;

a boot lens affixed to the polymer collimating lens for transmitting the collimated, multiplexed, polychromatic optical beam from the polymer collimating lens, the boot lens having a planar exit surface; and a diffraction grating formed at the planar exit surface of the boot lens for separating the collimated, multiplexed, polychromatic optical beam into a plurality of monochromatic optical beams.

40. The device as defined in claim 39, wherein the boot lens is incorporated into the polymer collimating lens such that the polymer collimating lens has the planar exit surface at which the diffraction grating is formed.

41. The device as defined in claim 39, wherein the boot lens is a first boot lens, the device further comprising:

a second boot lens affixed to the polymer collimating lens for transmitting the multiplexed, polychromatic optical beam to the polymer collimating lens.

42. The device as defined in claim 41, wherein the second boot lens has a planar entry surface for accepting the multiplexed, polychromatic optical beam from at least one optical source.

43. The device as defined in claim 39, wherein the polymer collimating lens has a planar entry surface for accepting the multiplexed, polychromatic optical beam from at least one optical source.

44. The device as defined in claim 39, wherein the diffraction grating is a transmissive diffraction grating.

45. The device as defined in claim 44, further comprising:

a transmissive element associated with the transmissive diffraction grating, the transmissive element having at least one reflective surface for reflecting the plurality of monochromatic optical beams.

46. The device as defined in claim 45, wherein the boot lens is a first boot lens, the device further comprising:

a second boot lens affixed to the transmissive element for transmitting the plurality of monochromatic optical beams from the transmissive element; and a polymer focusing lens affixed to the second boot lens for focusing the plurality of monochromatic optical beams.

47. The device as defined in claim 46, wherein the boot lens is incorporated into the polymer focusing lens such that the polymer focusing lens is affixed to the transmissive element.

48. The device as defined in claim 46, further comprising:

a third boot lens affixed to the polymer focusing lens for transmitting the plurality of focused, monochromatic optical beams from the polymer focusing lens.

49. The device as defined in claim 48, wherein the third boot lens has a planar exit surface for outputting the plurality of focused, monochromatic optical beams to at least one optical receiver.

50. The device as defined in claim 46, wherein the polymer focusing lens has a planar exit surface for outputting the plurality of focused, monochromatic optical beams to at least one optical receiver.

51. An integrated wavelength division demultiplexing device comprising:

a polymer focusing lens for focusing a plurality of monochromatic optical beams;

a boot lens affixed to the polymer focusing lens for transmitting the plurality of monochromatic optical beams to the polymer focusing lens, the boot lens having a planar entry surface; and a diffraction grating formed at the planar entry surface of the boot lens for separating a multiplexed, polychromatic optical beam into the plurality of monochromatic optical beams.

52. The device as defined in claim 51, wherein the boot lens is incorporated into the polymer focusing lens such that the polymer focusing lens has the planar entry surface at which the diffraction grating is formed.

53. The device as defined in claim 51, wherein the diffraction grating is a transmissive diffraction grating.

54. The device as defined in claim 53, further comprising:

a transmissive element associated with the transmissive diffraction grating, the transmissive element having at least one reflective surface for reflecting the multiplexed, polychromatic optical beam toward the transmissive diffraction grating.

55. The device as defined in claim 54, wherein the boot lens is a first boot lens, the device further comprising:

a second boot lens affixed to the transmissive element for transmitting the multiplexed, polychromatic optical beam to the transmissive element; and a polymer collimating lens affixed to the second boot lens for collimating the multiplexed, polychromatic optical beam prior to transmission by the second boot lens.

56. The device as defined in claim 55, wherein the second boot lens is incorporated into the polymer collimating lens such that the polymer collimating lens is affixed to the transmissive element.

* * * * *